Figure 1:
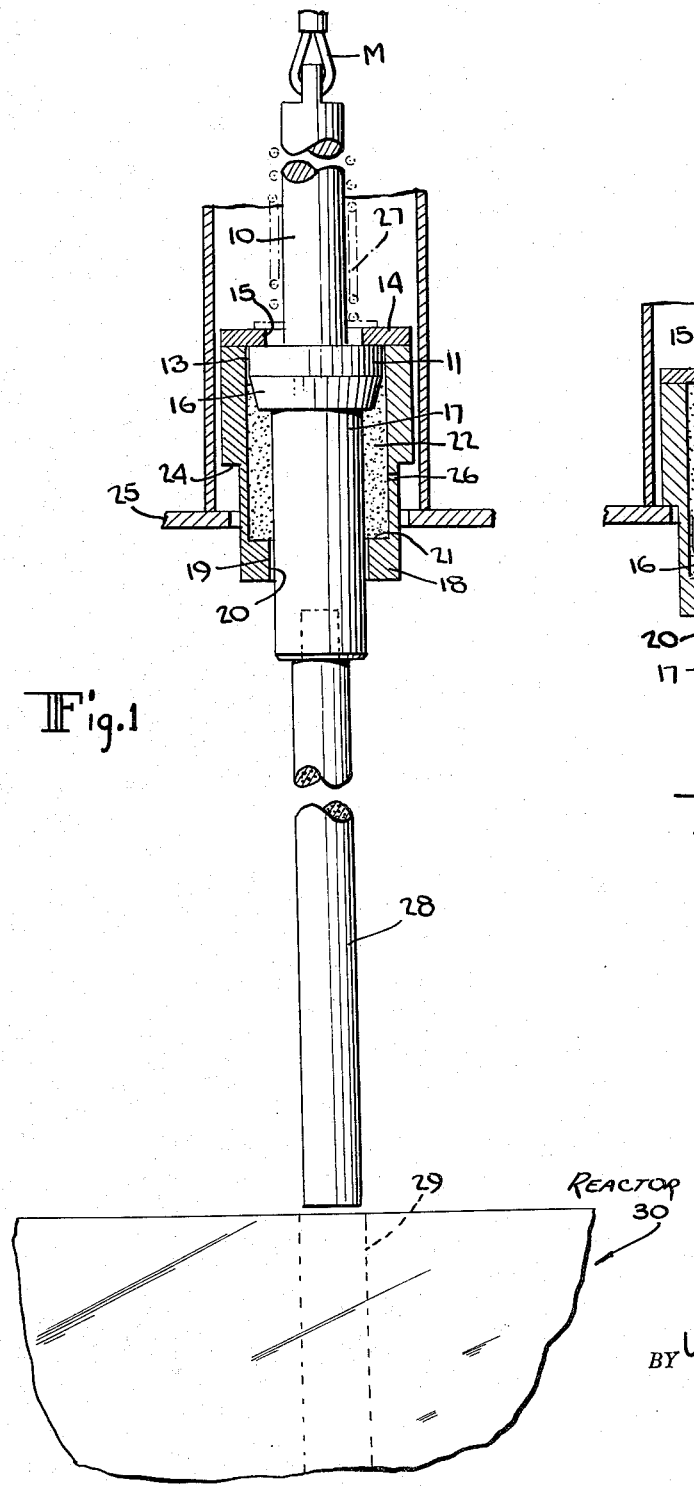

Aug. 1, 1961 W. J. TAYLOR, JR 2,994,655
DECELERATION CONTROLLER
Filed Oct. 4, 1957

INVENTOR.
Walter J. Taylor Jr.
BY Benjamin G. Weil
ATTORNEYS

United States Patent Office 2,994,655
Patented Aug. 1, 1961

2,994,655
DECELERATION CONTROLLER
Walter J. Taylor, Jr., Walbrook, Md., assignor to The Martin Company, a corporation of Maryland
Filed Oct. 4, 1957, Ser. No. 688,353
1 Claim. (Cl. 204—193.2)

This invention relates to a deceleration controller for a rod, tube or any other member intended to move through a fluid or other medium. The apparatus is particularly applicable to provide deceleration control for a control rod operating in a high pressure water reactor.

Any one of a number of circumstances may call for an emergency shutdown of a nuclear reactor, the shutdown being commonly referred to as a "scram." In the case of a high pressure water reactor, "scram" requires the rapid movement of one or several control rods which must be fully inserted into the reactor core in a minimum length of time. This requires very rapid acceleration and deceleration of the considerable mass of the control rod and all its attached parts.

Since the control rod is frequently of a composite construction and may be quite delicate, the real problem occurs when it becomes necessary to absorb the energy of motion of the rapidly moving rod when it is brought to a stop at the limit of its inward stroke movement without subjecting the rod to destructive mechanical shocks.

In the past, shock absorbing apparatuses have taken many forms including dash pot arrangements whose operation is based on the principle of converting the energy of motion of a member into work done in forcing an enclosed fluid through a restricted opening.

The use, however, of conventional dash pot arrangements has been found to incur difficulties and unsatisfactory results because one of the operating parts of the dash pot usually was attached to the moving rod or member while the other was attached at a fixed position. In the relatively long stroke of the rod, the moving dash pot part was of necessity separated from the stationary part. Moreover, a good mating fit is essential between these two parts in order that effective pumping action on the retarding fluid may be effected. It was necessary, therefore, that the separately mounted parts be very accurately aligned so that proper interengagement of the movable and stationary dash pot parts could be achieved. This alignment problem is serious particularly in a reactor which may require a considerable number of control rods each of which requires an independent dash pot arrangement or decelerator as an adjunct. This is brought out by reference to the reactor design for which the present deceleration controller was devised. In this reactor, each of the four control rods travels approximately 23 inches in about 0.3 second during "scram." This illustrative long stroke in this short period of time which includes the acceleration and deceleration times, clearly shows why the device of the present invention has many advantages over known deceleration mechanisms.

In addition to the alignment problem just noted, unnecessary friction occurs because of the close fits required for the guide bearings of the parts. Furthermore, problems involving the flow of displaced fluid during operation of the dash pots occur.

Principal features and objects of the present invention are the provision of novel deceleration control means which will obviate the disadvantages of the conventional dash pot arrangements such as those hereinabove mentioned.

The invention of this application contemplates overcoming the difficulties above-mentioned by incorporating a moving hydraulic dash pot means. This means comprises male and female elements both of which are adapted or intended to move along with the control rod during its stroke until the instant deceleration action is to occur. The arrangement permits extremely small clearances between the elements and insures minimum leakage of retarding fluid during deceleration. In addition, the arrangement may be provided with escape spaces or openings at predetermined positions or locations in order to provide either constant or varying rates of deceleration.

Further objects and features of the invention are to provide a decelerating arrangement that may be used with a control rod having a relatively long stroke in which deceleration is required to occur only during the terminal portion of the "scram" insertion stroke in a very short period of time.

Still other objects and features of the invention are the provision of a deceleration control mechanism which provides faster uniform "scram" action than has heretofore been possible with existing arrangements.

Still other objects and features of the invention are the provision of simple structures for the intended purposes that may be readily installed in new or existing reactors without material remodification of other structural components, or in other structure requiring similar deceleration features.

Figure 2:
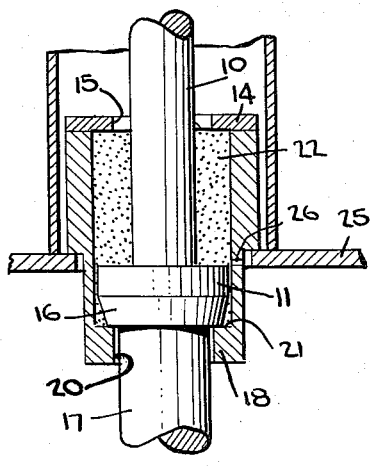

Additional objects and features of the invention will become apparent from the following specification and the accompanying drawing wherein:

FIGURE 1 is a cross sectional view of the novel deceleration control arrangement of this invention shown in one position of use with respect to the raising and lowering mechanism of a control rod for a high pressure water reactor; and FIGURE 2 shows the parts in a second position when after "scram" operation.

Referring to the drawing, the reference character 10 denotes an upper connecting rod whose upper end is releasably secured to an appropriate raising mechanism M. A pistion 11 is secured to the foot of the connecting rod 10. This piston 11 fits slidably within a dash pot cylinder 12, a relatively small clearance 13 being provided between the inner surface of cylinder 12 and the largest peripheral surface of the piston 11. A piston stop 14 is secured to the upper end of the cylinder 12 providing an upper limit to the movement of the piston 11 within the dash pot cylinder 12. The upper connecting rod 10 projects upwardly and outwardly through an opening 15 in the stop 14.

The piston 11 preferably has a tapered base portion 16 to which a lower connecting rod 17 of smaller diameter than the inner diameter of the dash pot 12 is secured. The lower connecting rod 17 is axially aligned with the upper connecting rod 10 along the center line of the cylinder 12. Its lower portion extends downwardly and outwardly through the base 18 of the cylinder 12. The opening 19 of the base 18 is slightly larger in diameter than the lower connecting rod 17 providing clearance 20 for purposes presently to be described. The length of stroke of the piston 11 within the dash pot cylinder 12 is defined by the stop 14 and the shoulder 21 at the base 18. However, since the dash pot cylinder 12 is not fixed and because of engagement of piston 11 with stop 14, it normally moves upwardly together with the upward movement of the connecting rods 10 and 17 and because of the fluid 22 in the cylinder, also downwardly with the two at substantially the same speed as the latter when the upper connecting rod 10 is released from the raising mechanism, because the fluid 22 in cylinder 12 acts to oppose the displacement of piston 11 in the cylinder 12. Thus the length of stroke of the connecting rods 10 and 17 upwardly can be anything desired as the dash pot cylinder 12 moves with them and does not limit their upward movement. In fact, cylinder 12 does not come into operation unless its motion is stopped. To this end, arrangement is made to stop downward motion of the cylinder 12 by provision of a ledge 24 on said cylinder which is engageable with a fixed stop or impact member 25. Once such engagement is effected and downward movement of cylinder 12 stopped, the piston 11 can only move downwardly within the dash pot cylinder 12 in opposition to the retarding fluid content 22 which lies between the lower face of the piston 11 and the lower stop 21 of cylinder 12. The clearances 13 and 20 and also selectively dimensioned lateral openings 26 in the wall of the cylinder 12 provide retarded flow escape passages for the fluid 22. This effects retarded or decelerating movement of the piston 11 and hence of the connecting rods 10 and 17 at a rate which is a function of the dimensions of the clearances 13 and 20 and of the escape passageways 26.

If desired, a coil spring or additional force producing mechanism 27 may be positioned about rod 10 to provide a downward thrust on the upper surface of the stop 14 so that downward movement of the connecting rods 10 and 17 then is the sum of gravitational force and the additional thrust force of the spring on said member 14, thus providing downward movement of the connecting rods with greater acceleration than that which would be effected by gravity alone. In this way, a more rapid "scram" control movement can be effected for the control rod 28 secured to rod 17 which must be fully inserted into the core 29 of reactor 30 to effect a "scram" action.

In operation, the raising mechanism is secured to the upper connecting rod 10 and elevated to a desired height. This elevation correspondingly elevates piston rod 11, connecting rod 17, control rod 28, dash pot cylinder 12 and all its components to the same extent and to a selected distance above the fixed stop impact surface 25. When a "scram" condition occurs, the upper connecting rod 10 is unlatched or released from the raising mechanism M either manually or automatically. Then gravity and if an additional spring 27 is provided both act to exert a combined downward acceleration to the connecting rods 10 and 17 as well as upon the dash pot cylinder 12 until the ledge 24 of the cylinder engages with the impact surface 25 at which time cylinder 12 is stopped from further movement. Inertia and gravity act, however, on connecting rods 10 and 17 and control rod 28 as well as on piston 11 so that they continue to move downwardly in opposition to the cushioning effect on piston 11 of the fluid 22 in the cylinder 12 below said piston which fluid can only escape through the clearances 13 and 20 and the openings 26. The speed of escape of the fluid determines the rate of decelerating action exerted on the piston 11 by the fluid 22 until the piston comes to rest on the stop 21 at which time the control rod reaches the end of its downward stroke and is fully inserted into reactor core 29 for effective "scram" action.

The relative dimensions of the clearances 13 and 20 need not be large since escape speed for the trapped fluid 22 can be regulated by the size and the number of the openings 26.

With this arrangement, therefore, uniformity of decelerating action can be provided at all times. Moreover, since the upward elevation of the connecting rods 10 and 17 is not in any way limited, the stroke of these rods can be of any length desired without requiring excessive dimensions for the dash pot cylinder 12 or for the motion of the piston 11 therein. Moreover, since decelerating action only occurs in the small periods of time between engagement of cylinder ledge 24 and the fixed impact stop 25, the major portion of the relatively long stroke of the connecting rods are in free or spring accelerated fall. The speed of operation of the control for effecting a "scram" thus is materially higher than would be the case if dash pot action existed during the entire stroke of the connecting rods.

In addition, since the dash pot cylinder 12 moves with the connecting rods, no problem of maintaining alignment between the cylinder and the piston and connecting rods exists since the piston is always within the cylinder. In addition, a close hydraulic fit may be secured between the piston 11 and the dash pot cylinder 12 and then regulation of the rate of deceleration may be effected simply by disposition and dimensional characteristics of the openings 26. Each, if desired, may even be equipped with a regulating valve (not shown).

In addition, engagement of the piston and the dash pot cylinder 12 exist at all times. This insures like decelerating characteristics with each "scram." Furthermore, faster "scrams" are possible than with known structures.

While a specific embodiment of the invention has been described, variations in structural detail within the scope of the appended claim are possible and are contemplated. There is no intention, therefore, of limitation to the exact details shown and described.

What is claimed is:

In a reactor having a core and at least one control rod insertable into said core, and including means for effecting rapid insertion of said rod into said core, said reactor also having structure including a tube for enclosing a portion of and for guiding said rod, said rod being longitudinally movable within said tube through a maximum rod stroke, the combination therewith of deceleration controlling means for said rod, comprising, a connecting rod secured to said control rod and supporting the latter over said core, a piston on said connecting rod, a cylinder for said piston, the outer peripheral wall of said piston being definably smaller in diameter than the inner peripheral wall of said cylinder to describe a passage therebetween thereby providing a first flow passage means, the peripheral wall of said piston also having a tapered annular portion on the lower end thereof, said cylinder being slidably movable within said tube and on said rod throughout the entire length of said maximum rod stroke, said cylinder also having a pair of end walls to define upper and lower limits for the movement of said piston within said cylinder, the outer peripheral wall of said cylinder having a lower reduced diameter portion to form an annular shoulder thereon, said shoulder being positioned substantially centrally of said limits, an inwardly depending flange in the inner wall of said tube at the lower end of said maximum rod stroke and engageable with said annular shoulder, a liquid medium in said cylinder, and second flow passage means in said cylinder for permitting restricted flow of said liquid medium from said cylinder as said piston moves from said upper limit to said lower limit, said second flow passage means including first and second orifices, said first orifice extending through said lower limit end wall, said second orifice extending through the peripheral wall of said cylinder and having inner and outer openings, said inner opening being in the inner surface of the peripheral wall of said cylinder and being located at a distance from said lower limit greater than the length of said tapered annular portion of said piston such that said inner opening is effectively closed by said piston as said piston finally approaches said lower limit, whereby rapid insertion of said control rod into said core causes said connecting rod to move within said tube through said maximum rod stroke at the end of which said inwardly depending flange engages said annular shoulder of said cylinder to arrest further movement thereof, said lower limit thus forcing said liquid medium through said first orifice at a steady rate, but through said second orifice at a diminishing rate to control the deceleration of said control rod.

(References on following page)

References Cited in the file of this patent

UNITED STATES PATENTS 2,088,875  Serste _____ Aug. 3, 1937

OTHER REFERENCES

Proceedings of the International Conference on the Peaceful Uses of Atomic Energy, August 8–20, 1955; vol. 3, pages 303, 305; United Nations, N.Y.

Boch et al.: ORNL–1613 (Rev. (Del.)), A Conceptual Design of a Pressurized Water Package Power Reactor, USAEC report dated June 6, 1955, declassified January 24, 1957; pages 41, 42, 43.